(No Model.)

J. EDGAR.
NUT LOCK.

No. 378,779. Patented Feb. 28, 1888.

Witnesses.
S. J. Beardslee.
J. Jessen.

Inventor.
John Edgar.
By R. O. Paul atty.

N. PETERS, Photo-Lithographer, Washington, D. C.

UNITED STATES PATENT OFFICE.

JOHN EDGAR, OF ROCHESTER, MINNESOTA.

NUT-LOCK.

SPECIFICATION forming part of Letters Patent No. 378,779, dated February 28, 1888.

Application filed October 17, 1887. Serial No. 252,553. (No model.)

*To all whom it may concern:*

Be it known that I, JOHN EDGAR, of Rochester, in the county of Olmsted and State of Minnesota, have invented certain new and useful Improvements in Nut-Locks, of which the following is a specification.

My invention relates to improvements in nut-locks; and it consists in providing a bolt with a primary nut so constructed as to bear against the plate or base upon one side and against the jam or check nut upon the opposite side of the bolt, whereby two separate and distinct forces are brought to bear to bind the said nut against the thread of the bolt, so that in case the nut becomes loosened by shrinkage or other cause from one side it will still be bound and locked by the action of the force exerted upon the other side.

My invention further consists in the construction and combination hereinafter described, and particularly pointed out in the claims.

Figure 1:
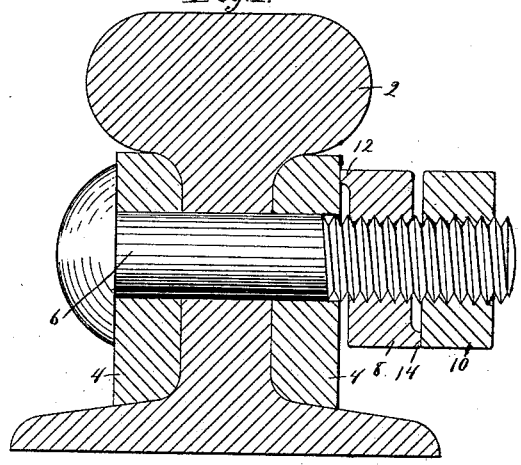
Figure 2:
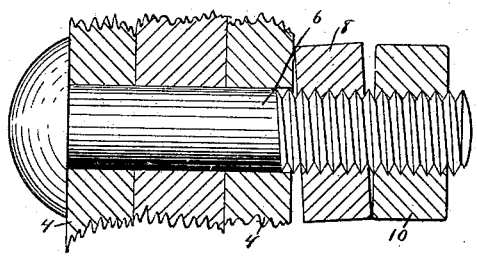
Figure 3:
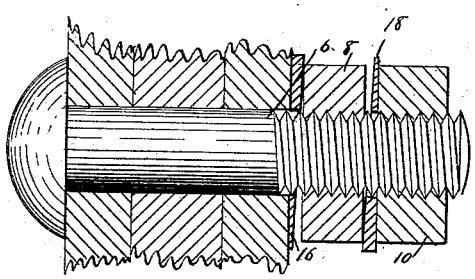
Figure 4:
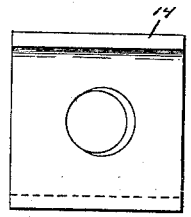

In the accompanying drawings, Figure 1 represents a cross-section of a T-rail, showing a bolt with my improvement adapted thereto. Figs. 2 and 3 are modifications of my improved nut-lock. Fig. 4 is a face view of one of the nuts.

In the drawings, 2 represents a T-rail of ordinary construction, in which the joints are covered by fish-plates 4.

6 is a bolt of ordinary construction passing through openings in the fish-plate and the rail, and screw-threaded to receive the nuts 8 and 10. The nut 8 is a primary nut, and may be constructed with a rib or projection, 12, placed upon one side or edge of the said nut, which bears against the fish-plate 4. A similar projection, 14, may be placed parallel to the projection 12, and located diagonally opposite upon the outer face of the said nut. This nut is turned upon the bolt until the projection 12 is brought in contact with the fish-plate 4. The pressure exerted between the fish-plate and the projection 12 forces this side of the nut outward and causes it to bind or jam against the inner surfaces of the threads of the bolt upon the side contiguous to the projection 12, and tends to force the opposite side inward, causing it to bind upon the outer surfaces of the thread. The check or jam nut is now placed upon the bolt and is turned down until the inner surface comes in contact with the projection 14 upon the nut 8. This causes pressure to be brought upon this projection and forces the nut 8 firmly against the outer surfaces of the threads, completing the operation, which has already been partially accomplished, by forcing the said nut 8 against the fish-plate, as already described. The pressure upon the two sides of the primary nut 8, caused by the bearing against the fish-plate and against the jam-nut 10, acting in unison, holds the said nut against the thread in a substantial and permanent manner.

The check-nut, which is an ordinary straight nut, as it strikes the primary nut, will be thrown across the threads and bind them in a manner substantially the same as in the primary nut, except in the opposite direction, so that the lines of strain, if produced, would meet and cut each other; and it will be seen that by this construction both nuts are secured or locked in position upon the bolt.

In Fig. 2 I have shown a simplified construction in which the primary nut is bored and the thread cut at an angle other than a right angle with the face of the nut. This construction causes the nut to stand diagonally upon the bolt, and as it is turned down upon the fish-plate one edge only will strike, and as the jam-nut, which is an ordinary straight nut, is turned upon the bolt its surface will be brought in contact with the opposite face at the edge diagonally across the nut from the first bearing. The distribution of the strain will be substantially the same in this construction as in the one already described. I am aware that this construction has been used with single nuts; but it is not practical, for the reason that as it binds the thread on one side only any shrinkage or loosening of the plates against which it bears relieves this strain and loosens the nut, whereas in my improvement by the introduction of the outer nut the two are bound together, and any shrinkage of either will not affect or loosen the nut, as, if the bolt should become elongated or the plates shrunken and the strain should be relieved from one side of the nut 8, the nut 10 still bears against the projection and holds the nuts firmly clamped or locked against the threads.

I have described my invention as used in connection with the fish-plates for holding railroad-rails, but it is equally applicable to other uses where the nuts are liable to become loosened.

In Fig. 3 I have shown still another construction, in which I prefer to insert a bevel-washer, 16, under the primary nut and another bevel-washer, 18, between the primary and check nuts. By placing the high side of the washers opposite each other upon the bolt two straight nuts may be used. The washers will act as wedges to throw the nuts across the thread and accomplish the same result as if the primary nut were constructed in the manner before described.

In the drawings the angles of the bearing-faces of the nuts are somewhat exaggerated to more clearly show the operation. It is intended, however, to form the nut in such a manner that the angle of the face will compensate for the movement of the nut in binding it across the thread, so that when the nuts are driven home they will rest fair upon the plate and upon each other.

I am aware that heretofore one beveled washer has been used arranged between the nut and the plate for the purpose of binding the nut on one side across the thread, and therefore my invention is limited to the two washers, whereby I am able to obtain the result which I seek, and which cannot be obtained by the use of the single washer.

I claim as my invention—

1. The combination, with the bearing-plate and the bolt 6, passing through said plate, of the nut 8, bearing against the plate at one edge only, and the jam-nut 10, bearing against the opposite edge of the nut 8 at a point diagonally opposed to the first bearing, in the manner and for the purpose substantially as described.

2. The combination, with the bolt 6 and the bearing-plate, of the nut 8, having the projection 12 on one face and at the edge thereof and the projection 14 on its other face at the diagonally-opposite edge, and the nut 10, bearing upon said projection 14, all substantially as described, and for the purpose set forth.

In testimony whereof I have hereunto set my hand this 5th day of October, 1887.

JOHN EDGAR.

In presence of—
WALTER HURLBUT,
F. E. GOODING.